US008095462B2

(12) United States Patent
Wallach

(10) Patent No.: US 8,095,462 B2
(45) Date of Patent: Jan. 10, 2012

(54) DYNAMIC ENROLLMENT CONTROL SYSTEM, METHOD AND COMPUTER PROGRAM PRODUCT

(75) Inventor: Benjamin T. Wallach, Montgomery, AL (US)

(73) Assignee: Regions Asset Company, Wilmington, DE (US)

( * ) Notice: Subject to any disclaimer, the term of this patent is extended or adjusted under 35 U.S.C. 154(b) by 2350 days.

(21) Appl. No.: 10/448,530

(22) Filed: May 30, 2003

(65) Prior Publication Data
US 2004/0243512 A1     Dec. 2, 2004

(51) Int. Cl.
G06Q 40/00     (2006.01)
(52) U.S. Cl. ........................................... 705/40; 705/35
(58) Field of Classification Search ............. 705/35–45, 705/14, 16, 25, 26, 66, 67; 709/201, 203, 709/206; 713/176, 156
See application file for complete search history.

(56) References Cited

U.S. PATENT DOCUMENTS

| | | | | |
|---|---|---|---|---|
| 5,287,270 A * | 2/1994 | Hardy et al. | .................. | 705/34 |
| 5,336,870 A * | 8/1994 | Hughes et al. | .................. | 235/379 |
| 5,465,206 A * | 11/1995 | Hilt et al. | .................. | 705/40 |
| 5,920,847 A * | 7/1999 | Kolling et al. | .................. | 705/40 |
| 5,978,780 A * | 11/1999 | Watson | .................. | 705/40 |
| 5,995,946 A | 11/1999 | Auzenne et al. | | |
| 6,055,567 A * | 4/2000 | Ganesan et al. | .................. | 709/219 |
| 6,183,362 B1 | 2/2001 | Boushy | | |
| 6,209,095 B1 * | 3/2001 | Anderson et al. | .................. | 713/176 |
| 6,292,789 B1 * | 9/2001 | Schutzer | .................. | 705/40 |
| 6,324,523 B1 | 11/2001 | Killeen, Jr. et al. | | |
| 6,334,116 B1 * | 12/2001 | Ganesan et al. | .................. | 705/34 |
| 6,339,766 B1 | 1/2002 | Gephart | | |
| 6,408,284 B1 * | 6/2002 | Hilt et al. | .................. | 705/40 |
| 6,493,685 B1 * | 12/2002 | Ensel et al. | .................. | 705/40 |
| 7,225,156 B2 * | 5/2007 | Fisher et al. | .................. | 705/50 |

(Continued)

FOREIGN PATENT DOCUMENTS
WO     WO/95/20854     *     8/1995

OTHER PUBLICATIONS 285 inactive credit cards closed with "use it or lose it" program. (Nov. 1991). Cost Control News, 2(20), 2. Retrieved Sep. 28, 2011, from Banking Information Source. (Document ID: 7441099).*

(Continued)

Primary Examiner — Alexander Kalinowski
Assistant Examiner — Abhishek Vyas
(74) Attorney, Agent, or Firm — Steptoe & Johnson LLP

(57) ABSTRACT

An enrollment control system for activating and deactivating enrollment of beneficiaries of a first entity in a service program, such as a bill pay service program, of a second entity. The system requests information from the second entity identifying beneficiaries enrolled in the program and the timing of services provided to the beneficiaries. A request is sent to the second entity to deactivate enrollment of beneficiaries who have not received services within a dormancy threshold time. Advantageously, no enrollment charges are incurred by the first entity for dormant beneficiaries not recently availing themselves of the second entity's services. Optionally, the system can monitor unfulfilled service requests and remove the corresponding beneficiaries from the deactivation request to avoid deactivating enrollment of a customer needing services. Further, the system detects new requests made by beneficiaries for services from the first entity and requests reactivation of the beneficiaries' accounts by the second entity.

31 Claims, 4 Drawing Sheets

U.S. PATENT DOCUMENTS

| | | | |
|---|---|---|---|
| 7,312,722 B2 * | 12/2007 | Tillotson et al. | 340/932.2 |
| 2001/0032183 A1 * | 10/2001 | Landry | 705/40 |
| 2001/0037296 A1 * | 11/2001 | Ganesan et al. | 705/40 |
| 2001/0047330 A1 | 11/2001 | Gephart et al. | |
| 2002/0019739 A1 | 2/2002 | Juneau et al. | |
| 2002/0029248 A1 * | 3/2002 | Cook et al. | 709/206 |
| 2002/0059430 A1 * | 5/2002 | Orbke et al. | 709/227 |
| 2002/0065772 A1 | 5/2002 | Saliba et al. | |
| 2002/0066103 A1 | 5/2002 | Gagnon et al. | |
| 2002/0133459 A1 | 9/2002 | Polk et al. | |
| 2002/0143709 A1 * | 10/2002 | Diveley | 705/74 |
| 2002/0198828 A1 * | 12/2002 | Ludwig et al. | 705/40 |
| 2004/0049439 A1 * | 3/2004 | Johnston et al. | 705/34 |
| 2005/0187872 A1 * | 8/2005 | Schmidt et al. | 705/40 |

OTHER PUBLICATIONS

Wyatt, Craig. (Sep. 1995). Usage models just for merchants. Credit Card Management, 8(6), 32. Retrieved Sep. 28, 2011, from ABI/INFORM Global. (Document ID: 6952652).*

* cited by examiner

DYNAMIC ENROLLMENT CONTROL SYSTEM, METHOD AND COMPUTER PROGRAM PRODUCT

BACKGROUND OF THE INVENTION

1. Field of the Invention

The present invention is related to systems, methods and computer program products for enrolling customers into service programs by third party providers, and more particularly systems, methods and computer program products for the enrollment of customers in bill pay service programs.

2. Description of Related Art

Bill payment services, especially bill pay services associated with online banking, have been experiencing increasing popularity in recent years. Banking and other financial institutions are therefore under pressure to provide bill pay services to remain competitive.

An example of a bill pay system is described in U.S. Pat. No. 6,292,789 to Shutzer ("Schutzer"). Schutzer describes an electronic bill presentment system that permits billers to send bills to the consumers using the system and permits consumers to receive bills from all of the billers using the system. However, providing such services requires costly investment in the hardware, software, personnel and other capital facilities necessary to implement bill pay services.

As an alternative to purchasing, or otherwise directly implementing a bill pay system, financial institutions often seek the assistance of a third-party bill pay service provider having its own bill pay system. Customers who log onto the financial institution's online bill pay site interact with the financial institution as if it were the bill pay provider. However, the financial institution has actually enrolled the customers into a bill pay program implemented by the third-party bill pay service provider. Therefore, the financial institution's use of a third-party bill pay service provider is transparent to the customer.

Subsequent to enrollment, bill payment requests by the customers are compiled periodically and forwarded electronically, along with the funds necessary for payment, to the bill pay provider. The bill pay provider then pays each of the bills as instructed, forwarding bill payment information and the funds to the billing organization either electronically or through conventional mail. The bill pay provider is typically compensated for its services based on the number of customers currently enrolled in its program.

Despite the cost-savings realized from using third-party bill pay service providers, the ongoing costs of enrolling a large amount of customers can still be relatively high. Therefore, financial institutions having their own bill pay service have somewhat of a competitive cost advantage over the long term. As a result, further cost reductions in the cost of providing bill pay services and, in particular, third-party bill pay service are desired by financial institutions.

Therefore, it would be advantageous to have a system for providing bill pay services to a banking institution without the banking institution having to make significant upfront investments in bill pay service facilities. In addition, it would be advantageous if the system were more cost-efficient than current systems using third-party bill pay service providers.

SUMMARY OF THE INVENTION

The above needs are addressed, and other advantages achieved, by providing a dynamic enrollment control system, method and computer program product for selectively activating and deactivating enrollment of a plurality of beneficiaries of a first entity in a service program, such as a bill pay service program, of a second entity. The system, method and computer program product is capable of identifying the last time services were provided to each of the enrolled beneficiaries and of comparing the elapsed time to a dormancy threshold. The system, method and computer program product requests deactivation of enrollment of the dormant beneficiaries by the second entity. In this manner, no enrollment charges are incurred by the first entity for dormant beneficiaries not recently availing themselves of the second entity's services. Optionally, the system, method and computer program product may be capable of monitoring unfulfilled service requests and removing the corresponding beneficiaries from the deactivation request to avoid deactivating enrollment of a customer about to need the services. Further, the system, method and computer program product may be capable of detecting new requests made by beneficiaries for services from the first entity and of requesting reactivation of the beneficiaries' accounts by the second entity. Advantageously, the system, method and computer program product performs the deactivation and reactivation in a manner that is transparent to the beneficiaries.

In one embodiment, the present invention includes a dynamic enrollment control system for selectively activating and deactivating enrollment of a plurality of beneficiaries of a first entity in a service program of a second entity. Included in the dynamic enrollment control system is a service program monitoring system that is connected in electronic communication with the second entity. The service program monitoring system is capable of requesting and receiving provided services information from the second entity. Described by the provided services information are the beneficiaries who are currently enrolled in the program and a most recent date of the services provided by the second entity to the enrolled beneficiaries.

Also included in the dynamic enrollment control system is a dormancy determination system connected in communication with the service program monitoring system. The dormancy determination system is capable of determining an elapsed time between a present date and the most recent date of service provided to each of the beneficiaries described in the provided services information. Further, the dormancy determination system is capable of comparing the elapsed time to a dormancy threshold time to determine which of the beneficiaries have not been provided services within the dormancy threshold time. These beneficiaries are then compiled in a dormant customer file.

A service request activity monitoring system is connected in electronic communication with the first entity. From the first entity, the service request activity monitoring system is capable of requesting and receiving service request activity information describing each of the beneficiaries that have made service requests that have not yet been fulfilled by the second entity.

The dynamic enrollment control system also includes a deactivation system connected in electronic communication with the second entity, the dormancy determination system and the service request activity monitoring system. The deactivation system is capable of compiling deactivation request information by removing the beneficiaries described in the service request activity information from the beneficiaries described in the dormant customer information. In addition, the deactivation system is capable of sending the deactivation request information to the second entity for deactivation of the beneficiaries described therein from the service program.

Optionally, the dynamic enrollment control system may also include a reactivation system connected in electronic communication with the second entity, the service program monitoring system and the service request activity monitoring system. The reactivation system is capable of compiling reactivation request information by removing the currently enrolled beneficiaries described in the provided services information from the beneficiaries described in the service request activity information. In addition, the reactivation system is capable of sending the reactivation request information to the second entity for enrollment of the beneficiaries described therein in the service program.

As another option, the dynamic enrollment control system may include an error determination system connected in communication with the second entity. The error determination system is capable of requesting and receiving from the second entity enrollment rejection information describing the beneficiaries from the reactivation request information that the second entity failed to enroll in the service program. In addition, the error determination system is further capable of manually enrolling the beneficiaries from the enrollment rejection information. In yet another aspect, the error determination system may be capable of withholding verification of fulfillment of the service requests made by the beneficiaries with rejected enrollment until after successful enrollment of the beneficiaries.

As another option, the dynamic enrollment control system may also include an initial deactivation system connected in electronic communication with the second entity and the dormancy determination system. The initial deactivation system is capable of sending the dormant customer information directly to the second entity for deactivation of all of the beneficiaries described therein from the service program. Preferably, the initial deactivation system operates only a single time upon startup of the dynamic enrollment control system.

Comparable methods and computer programs products are also provided according to other aspects of the present invention. Regardless of the expression as a system, method and computer program product, the present invention has many advantages. For instance, the dynamic enrollment control system, method and computer program product deactivates the enrollment of customers not actively using the bill pay system which reduces the costs of operation for the financial institution. In addition, the reactivation system ensures that any pending bill payment requests logged with the financial institution are fulfilled by reactivating the requesting customer's enrollment. Such reactivations are performed on a relatively short cycle, e.g., daily, so that the dynamic enrollment control system, method and computer program product is relatively transparent to the customers. In other words, the delay in fulfillment of the bill pay request is no longer for the deactivated customer than for the currently enrolled customer. The error handling system ensures that all of the deactivated customers that are not successfully reactivated by the reactivation system are manually reactivated almost immediately and that bill payment is not erroneously verified before the bill payment request is successfully submitted to the bill payment system.

BRIEF DESCRIPTION OF THE DRAWINGS

Figure 1:
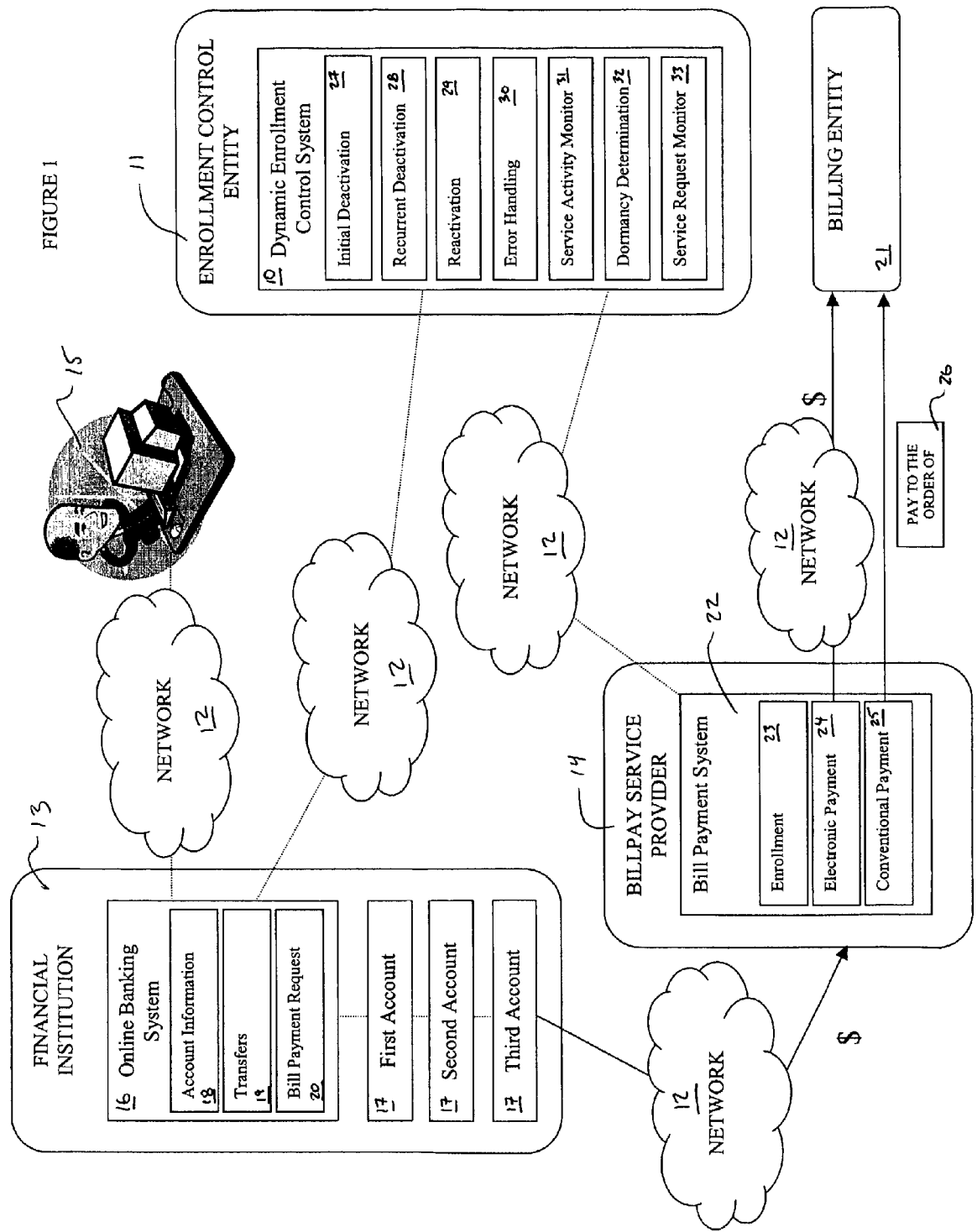
Figure 2:
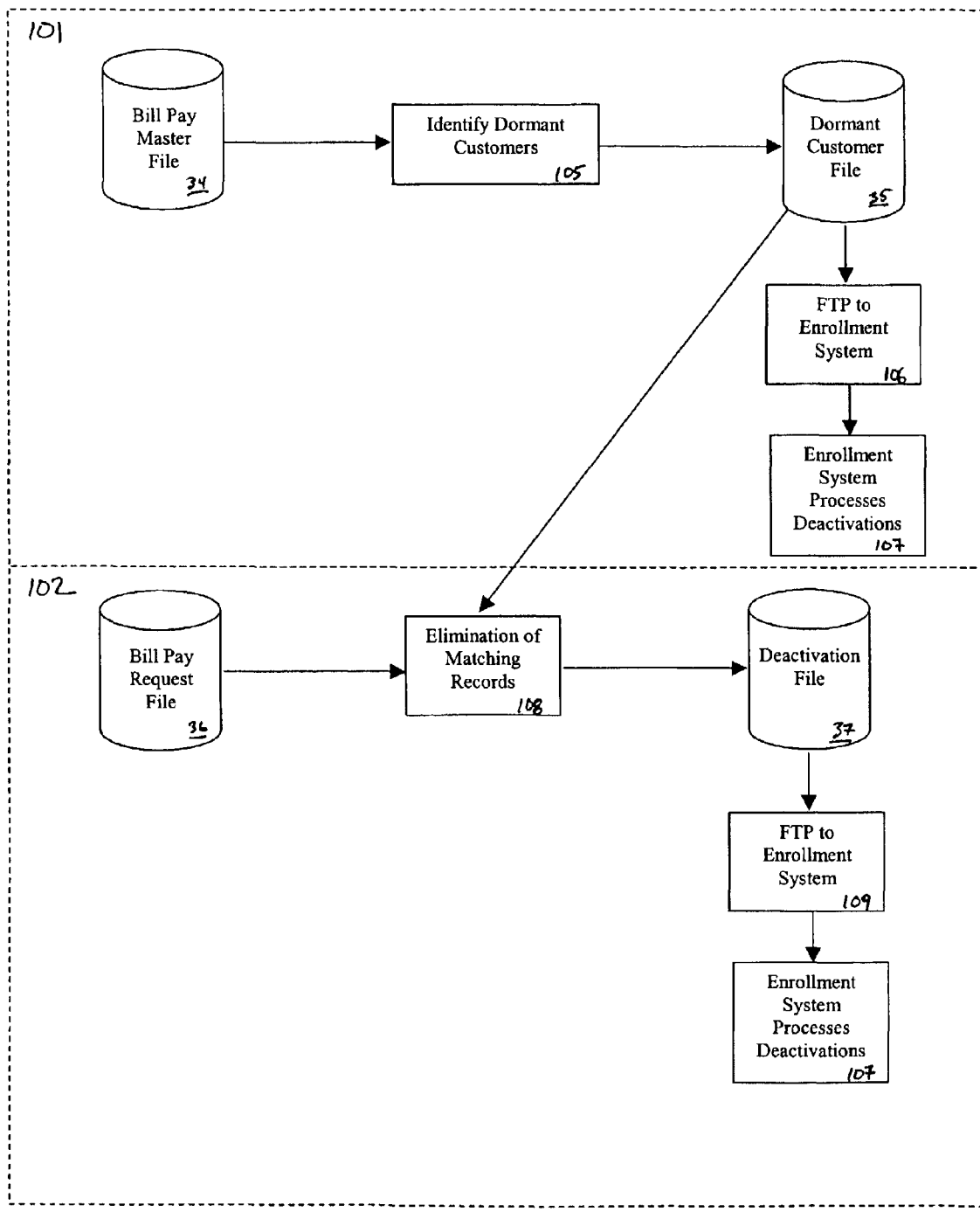
Figure 3:
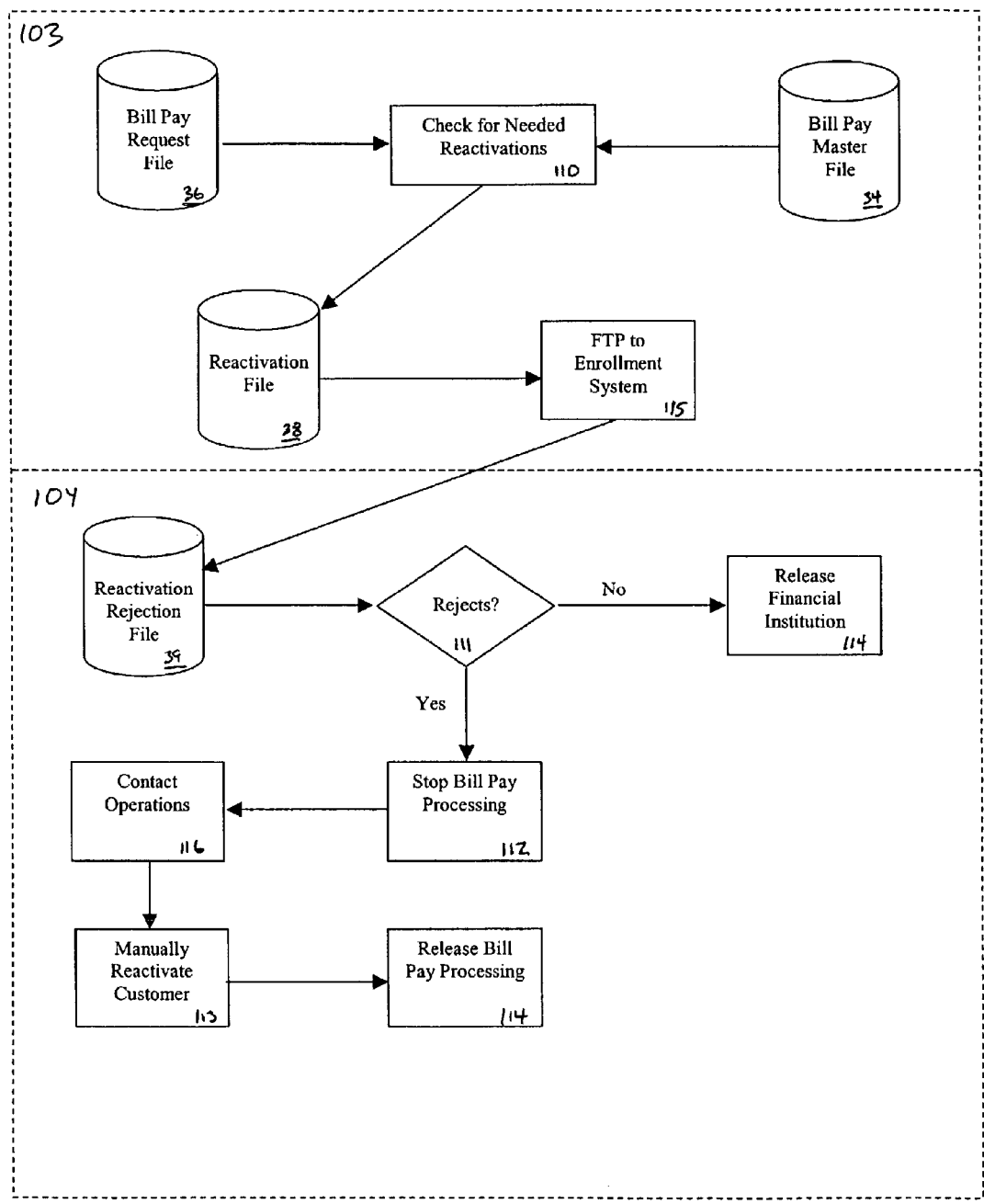
Figure 4:
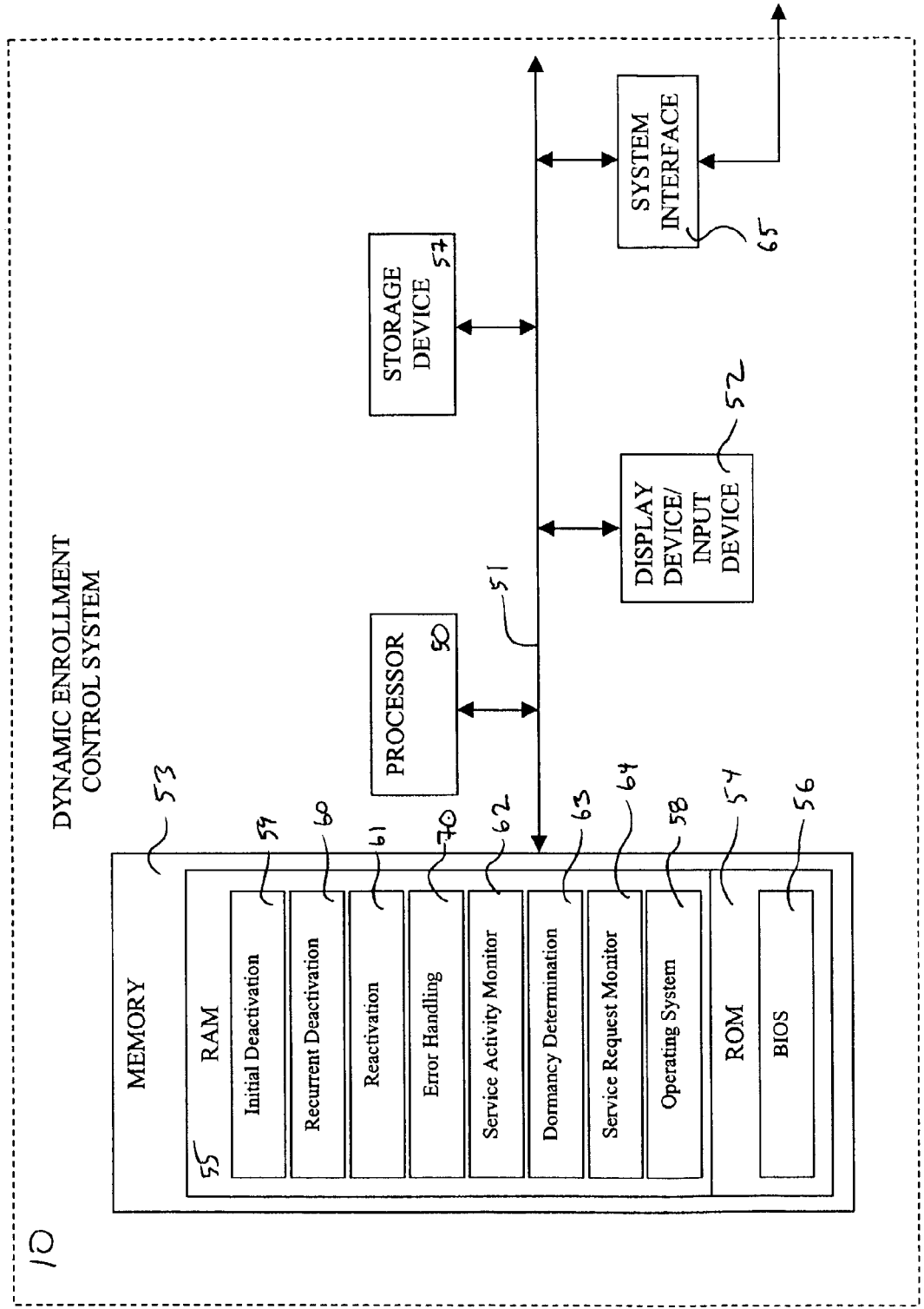

Having thus described the invention in general terms, reference will now be made to the accompanying drawings, which are not necessarily drawn to scale, and wherein:

FIG. 1 is a schematic of a dynamic enrollment control system of one embodiment of the present invention interacting with an online banking system and a bill payment system;

FIG. 2 is a flow diagram of an initial deactivation phase and a recurrent deactivation phase of a dynamic enrollment control method of another embodiment of the present invention;

FIG. 3 is a flow diagram of a reactivation phase and error handling phase of the dynamic enrollment control method partially illustrated in FIG. 2; and FIG. 4 is a schematic diagram of the dynamic enrollment control system of FIG. 1.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A system 10 for dynamic control of enrollment in a services program is illustrated in FIG. 1. The dynamic enrollment control system is shown as being part of a enrollment control entity 11 and is connected in communication via one or more networks 12 with a financial institution 13 and a bill pay service provider 14. Connected over the network 12 to the financial institution for the purpose of using online banking services are one or more customers 15. Generally, the dynamic enrollment control system 10 acts as an intermediary between the financial institution 13 and the bill pay service provider 14 by activating or deactivating enrollment of various customers 15 in the bill pay services program operated by the bill pay service provider 14 depending upon the timing of bill pay services usage by the customers. Although the enrollment control entity is depicted separately from the financial institution, the enrollment control entity may be subsumed within the financial institution in one embodiment.

Although the embodiment illustrated herein describes the use of the dynamic enrollment control system 10 to control enrollment in bill pay services, the system is also applicable to other service programs. For instance, an employer could use the dynamic enrollment control system to control enrollment of its employees in a parking services program based on usage of a parking lot by each of its employees. Other examples include enrollment in gym memberships, cleaning services, airline mileage programs, etc.

Therefore, it should be recognized that the dynamic enrollment control system 10 can be adapted for use in any situation where it is beneficial for a first entity having the responsibility or desire to obtain services for a beneficiary (e.g., customer, employee or student), to control enrollment of the beneficiary in a service program of a second entity. The term "service" and "services" as used herein should also be considered to further include provision of goods and/or the services that accompany such goods. For instance, a program for supplying and installing spare parts in an automobile.

The term "entity" as used herein should be construed broadly as including any corporation, person, company, firm, etc., capable of performing the functions described herein. Although the exemplary first and second entities in the illustrated embodiments are separate corporations, namely the financial institution 13 and the bill pay service provider 14, the entities could also be closely affiliated or commonly owned. For instance, the entities could be different internal departments of a single corporation wherein one of the entities is using the services of another one of the entities to supply some goods or services to a beneficiary.

It should be also noted that the term "network" as used herein should be construed broadly to include all types of electronically assisted communication such as wireless networks, local area networks, wide area networks, public networks such as the Internet, public telephone networks, or various combinations of different networks.

Various figures of the present application include block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto, or otherwise executable by, a computer or other programmable apparatus to produce a machine, such that the instructions which execute on the computer or other programmable apparatus create means for implementing the functions specified in the block diagram, flowchart or control flow block(s) or step(s).

These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Referring again to FIG. 1, the financial institution 13 includes an online banking system 16 and a plurality of accounts 17 associated with each customer 15. For instance, each customer may have one or more types of account such as checking, savings, credit or brokerage accounts. Typically, bill pay services are associated with a checking account from which electronic or paper checks are distributed to various billing entities. Such accounts, of course, need not hold physical things and can be an electronic representation of credits and debits which results in a balance for which the financial institution 13 is obligated to pay upon request of the customer 15.

Regardless, the online banking system 16 has access to the accounts 17 (as is indicated by the dashed line extending therebetween) that facilitates provision of bill payment services, as well as conventional online banking services. Included in the online banking system 16 are an account information system 18, a transfer system 19 and a bill payment system 20. The account information system 18 is capable of determining and communicating debits, credits, balances, account numbers, interest rates and other information to the customer 15 over the network 12. For instance, in the case of an Internet accessible banking system 16, the customer 15 logs onto a secure web site operated by a server or other computer system of the banking system and is shown the balances and account numbers for each of his accounts 17.

The transfer system 19 is capable of conducting transactions between the accounts 17 which are under the control of the financial institution 13. For instance, one of the accounts 17 may be a credit line with a negative balance and another one of the accounts a checking account. The customer desiring to pay the balance on the credit line enters the appropriate information (account numbers, amount, etc.) over the Internet into a transfer web page hosted by the transfer system 19. Typically, such transfers occur almost instantly because the accounts 17 are kept track of by the same computer system. Then, the customer 15 can view the reduced negative balance of the credit line and reduced positive balance of the checking account by consulting account information system 18.

The online banking system 16 can have other systems which are not described herein due to their conventional nature and could include such systems as an equity trading system, a loan application system, etc. The descriptions of the account information system 18 and transfer system 19 are largely included herein for illustrative purposes and to provide context for operation of the present invention. Of course the account information system and transfer system would be more relevant if the information and transfer services were provided via enrollment in a services program of a second entity.

More particular to the illustrated embodiment of the dynamic enrollment control system 10 of the present invention is the bill payment request system 20. Preferably, the bill payment request system 20 is also accessible by the customer 15 via the network 12 (e.g., the Internet) as part of the overall online banking system 16 as is indicated by the dashed line between customer and the online banking system. When accessed, the bill payment request system 20 typically provides the customer 15 with a list of options for directing payment to one or more billing entities 21 in amounts and at times selectable by the customer. Associated with most payments is a delay time from which the bill payment, or other service request, is entered by the customer 15 and the bill payment service is actually rendered.

Referring again to FIG. 1, the bill pay service provider 14 operates a bill payment system 22 that includes an enrollment system 23, an electronic payment system 24 and a conventional payment system 25. The electronic payment system and conventional payment system operate in the alternative, the electronic payment system when the billing entity 21 accepts electronic payment and the conventional payment system when the billing entity does not accept electronic payment and instead accepts conventional paper-based payments. The enrollment system 23 includes a database with information on each of the enrolled customers 15, including a transaction history for each of the customers. For instance, the enrollment system 23 may include a list of each of the currently enrolled customers 15 of the financial institution 13 along with a date of the customer's most recently fulfilled bill pay request.

Each time the customer 15 requests payment of a bill, such as a bill submitted electronically via one of the networks 12 to the customers' online banking account, the bill payment request is forwarded (typically in a batch of other bill payment requests via one of the networks 12) by the financial institution 13 to the bill pay service provider 14. Alternatively, the bill payment requests could be routed through the dynamic enrollment control system 10 to the bill pay service provider 14.

Upon receipt of the bill pay request, the bill payment service provider 14 confirms enrollment of the customer by consulting a database within the enrollment system 23. If the billing entity 21 accepts electronic payment, the electronic payment system 24 sends an electronic draft that can be posted to the financial institution 13 or makes an actual electronic transfer of funds via a secure network 12. If the billing entity 21 is not equipped to receive electronic payment, the conventional payment system 25 prints out a check or draft 26 and mails it to the billing entity 21.

Accompanying each bill payment request, is an electronic transfer of funds to the bill pay service provider over a secure network, as is indicated by the solid line on FIG. 1. The transfer of funds can occur immediately, or can be sent at a future time, for instance as part of a daily bulk transfer of funds with information on the amounts allocated for each a single day's bill payment requests. As an alternative to the funds being sent through the bill pay service provider 14, the bill pay service provider can simply send the electronic or paper draft 26 that enables the billing entity 21 to obtain the funds directly from the financial institution 13.

Also after each bill pay request, the financial institution 13 debits one of the customer's account 17 for the amount of the bill being paid. Debiting of the customer's account is typically performed before the funds are sent to the bill pay service provider 14, or the funds are escrowed in anticipation of presentation of an electronic or paper draft by the billing entity 21. In this manner, the financial institution 13 ensures that the necessary funds are available for fulfilling the bill payment request.

The dynamic enrollment control system 10 of the illustrated embodiment is connected in electronic communication (as is indicated by the dashed lines) via the networks 12 to the online banking system 16 and the bill payment system 22 of the bill pay service provider 14. Included in the online banking system 16 are several primary systems including an initial deactivation system 27, a recurrent deactivation system 28, a reactivation system 29 and an error handling system 30, as shown in FIG. 1. Other systems including a service program activity monitoring system 31, a dormancy determination system 32 and a service request activity monitoring system 33 are also included and operate in conjunction with the primary systems to selectively activate and deactivate enrollment of the customers 15.

The service program monitoring system 31 is configured to request and receive a bill pay master file 34 from the enrollment system 23 of the bill pay service provider 14, as is shown in another embodiment illustrated in FIG. 2. In the bill pay master file 34 is provided services information on the currently enrolled customers 15 and the various bill pay services rendered to each of the currently enrolled customers by the bill pay service provider 14.

Connected in communication with the service program monitoring system 31 is the dormancy determination system 32. The dormancy determination system is capable of obtaining the bill pay master file 34 and of extracting information on each of the currently enrolled customers 15 and their latest requested and/or fulfilled bill pay transaction. For instance, the bill pay master file 34 could be obtained over the network 12 using file transfer protocol (FTP).

The dormancy determination system 32 can determine an elapsed time since the last transaction for each of the customers 15 by subtracting the last transaction date culled from the bill pay master file 34 from a present date extracted from a clock (not shown) of the system 10. In addition, the dormancy determination system 32 has program logic for comparing one or more dormancy thresholds against the elapsed time of each of the customers 15.

Alternatively, the dormancy determination system 32 may have logic that subtracts the dormancy threshold from the current date to determine a cutoff date (which in itself becomes a threshold) against which the date of each customer's transaction is compared. Those customers 15 wherein the elapsed time since the last transaction is greater than the threshold are dormant customers. The dormancy determination system also includes logic for generating a dormant customer file 35 describing the dormant customers, as is shown in the embodiment of FIG. 2.

The dormancy threshold can be any amount of time including days, weeks, or even longer, and is preferably selected to separate customers 15 likely to use the service periodically from customers that are only one-time or sporadic users. Therefore, depending upon the service for which the dynamic enrollment control system is being used, tendencies of the customers, tolerability of the bill pay service provider 14 to requests for activation and deactivation of enrollment, and other factors, the dormancy threshold can be adjusted as desired. In addition, the dormancy threshold may be modified depending upon whether an initial deactivation is being conducted, or a recurrent deactivation is being conducted.

It should also be noted that the dormancy determination system 32 can conduct more complex comparisons wherein either the dormancy threshold can be modified depending upon various factors specific to individual customers. For instance, the dormancy threshold could be adjusted (or time credited or deducted from the elapsed time) to account for statistical tendencies of customers belonging to groups having a certain income level, age, gender or deposit amount in one of the accounts 17. In another example, adjustments can be made to the threshold based on the past bill payment request history of the customer 15. For instance, if a threshold time is originally a month, and the customer has had to be re-enrolled every other month for a bimonthly bill payment request, the threshold could be increased to two months.

The service request activity monitoring system 33 is connected in communication, such as via the network 12, with the online banking system 16, and in particular the bill payment request system 20. The service request activity monitoring system 33 is capable of requesting and receiving (such as by using FTP) a bill pay request file 36 from the bill payment request system 20. The bill pay request file 36 includes information on the pending service request activities of each of the customers 15 of the financial institution 13. Preferably, the service request activity monitoring system 33 is capable of obtaining the bill pay request file on a daily basis so as to capture daily bill pay requests for reasons which will be explained below.

The initial deactivation system 27 is connected in communication with the dormancy determination system 32 and with the enrollment system 23 of the bill pay service provider 14. The initial deactivation system is capable of receiving the dormant customer file 25 from the dormancy determination system 32 and forwarding the dormant customer file to the enrollment system 23 (such as via FTP) in an initial deactivation request.

Also, the initial deactivation system 27 may include logic that senses startup of the dynamic enrollment control system 10 for a particular financial institution 13. In response to sensing the startup, the initial deactivation system 27 is preferably configured to send the dormant customer file 25 to the enrollment system 23 for an initial, blanket deactivation for all customers only a single time. After the initial deactivation request is sent, the initial deactivation system 27 is configured to cede control of enrollment deactivations to the recurrent deactivation system 28. Preferably, initial deactivation occurs on a weekend or an off day so that pending bill payment requests are not overly delayed before the reactivation system can reactivate the customers having pending bill payment requests the next day.

The recurrent deactivation system 28 is connected in communication with the dormancy determination system 32, the service request monitoring activity monitoring system 33 and the enrollment system 23 of the bill pay service provider 14. The recurrent deactivation system is capable of receiving the dormant customer file 25 from the dormancy determination system 32 and the bill pay request file 36 from the service request activity monitoring system 33.

In addition, the recurrent deactivation system 28 includes logic capable of comparing the customers 15 listed in the dormant customer file 25 to the bill pay request file 36. Such a comparison allows the recurrent deactivation system 28 to determine which of the prospective customers for enrollment deactivation have requested bill payment services of the bill payment request system 20 wherein the service requests have not yet been fulfilled by the bill payment system 22. The recurrent deactivation system 28 is further configured to eliminate the customers 15 with pending bill pay requests from the customers listed in the dormant customer file 25 so as to create a recurrent deactivation file 37.

Once the recurrent deactivation file is created, the recurrent deactivation system 28 is configured to send the recurrent deactivation file (such as via FTP) to the enrollment system 23 of the bill pay service provider 14. The enrollment system is capable of using the recurrent deactivation file 37 to deactivate enrollment of the customers indicated therein.

The reactivation system 29 can obtain the bill pay request file 36 from the service request activity monitoring system 33 and the bill pay master file 34 from the service program monitoring system 31. In addition, the reactivation system 29 includes logic capable of comparing the currently enrolled customers 15 from the bill pay master file 34 to the customers listed in the bill pay request file 36 as requesting bill pay services that have not yet been fulfilled.

The reactivation system 29 is configured to create a reactivation file 36 describing customers with pending bill pay requests from the bill pay request file 36 that are not listed as being currently enrolled in the bill pay program by the bill pay master file 34. In addition, the reactivation system 29 is connected in communication with the enrollment system 23 of the bill pay service provider 14 and can send the reactivation file 36 as part of a reactivation request to the enrollment system, such as via the network 12 using FTP. Upon receipt of the reactivation file 36, the enrollment system 23 reactivates the enrollment of the customers listed therein.

Preferably, the reactivation system 29 is configured to operate on a daily cycle so that pending bill payment requests do not take excessively long to fill. Longer delays could lead to customer dissatisfaction and possible late payment of bills if the customer is not forewarned of a minimum delay. However, other cycle times could be used to ensure faster reactivation, such as in a case where bill payment requests are batched multiple times per day, or slower reactivation, such as in a case where all bills are held for a single monthly billing payment. Typically, however, the reactivation system is configured such that the reactivation process is transparent to the customer. In other words, the customer is unaware of the deactivation and subsequent reactivation of the bill payment services.

The error handling system 30 is connected in communication with the enrollment system 23 over the network 12 and is capable of receiving a reactivation request rejection file 39. The rejection file describes the customers 15 from the reactivation file 38 that the enrollment system 23 failed to reactivate. Failure could occur for reasons such as the enrollment system is undergoing maintenance or is otherwise offline or malfunction. In another example, some of the data describing the customers in the reactivation file could be improperly formatted. Upon notification of the rejections, personnel of the error handling system 30 can log directly onto the enrollment system 23 to manually activate the each of the rejected customers. In addition, the error handling system 30 can remove the bill pay request that resulted in the attempt at reactivation from a payment verification file of that day and place it in the next day's payment verification file. In this manner, the error handling system ensures that the customer is not falsely informed that the bill payment services have been rendered and the bill has been paid.

Optionally, the error handling system 30 could be completely automated. For instance, the customers from the rejection file 39 could be added again to the reactivation file 38 and submitted directly, or through the reactivation system 29, to the enrollment system 23. Another failure could result in manual intervention, or use of some generally more robust automatic process for reactivating enrollment.

During operation, the dynamic enrollment control system 10 of the illustrated embodiment can potentially include four phases of operation which may, or may not operate simultaneously, or in a particular order. In particular, the dynamic enrollment control system may have an initial deactivation phase 101, a recurrent deactivation phase 102, a reactivation phase 103 and an error handling phase 104, as is shown in the flow charts of FIGS. 2 and 3.

During the initial deactivation phase 101, service program monitoring system 31 obtains the bill pay master file 34, preferably electronically over the network 12 via FTP, from the enrollment system 23. As above, the bill pay master file 34 describes the currently enrolled customers 15 and the bill pay services recently provided to each of the customers by the bill pay service provider 14. The dormancy determination system 32 identifies 105 dormant customers, such as by calculating an elapsed time between a present date and the latest date of services rendered from the bill pay master file 34 and comparing the elapsed time to a dormancy threshold time.

Customers 15 having a latest transaction with an elapsed time exceeding the threshold time are added to the dormant customer file 35. The dormant customer file is formatted (if necessary) and transmitted 106, preferably via FTP over the network 12, by the initial deactivation system 27 to the enrollment system 23 of the bill pay service provider 14. Customers in the dormant customer file 35 then have their enrollment deactivated 107 by the enrollment system 23. As noted above, the initial deactivation phase 101 preferably occurs only a single time upon startup of the dynamic enrollment control system 10 after which recurring deactivation 102 begins.

In the recurring deactivation phase 102, the service request activity monitoring system 33 obtains the bill pay request file 36, preferably electronically over the network 12 via FTP, from the bill payment request system 20 of the financial institution 13. The recurrent deactivation system 28 eliminates 108 matching customers 15 from the dormant customer file 35 to create a recurrent deactivation file 37. Then, the recurrent deactivation system 28 formats (if necessary) and sends 109, preferably electronically over the network 12 using FTP, the recurrent deactivation file 37 to the enrollment system 23. The enrollment system then deactivates 107 the enrolment of the customers described in the deactivation file 37.

In the reactivation phase 103, the bill pay request file 36 is obtained periodically (preferably daily) from the service request activity monitoring system 33 and the bill pay master file 34 is obtained periodically (also preferably daily) from the service program monitoring system 31, as shown in FIG. 3. The reactivation system 29 extracts a list of currently enrolled customers from the bill pay master file 34 and eliminates the enrolled customers from the bill pay request file 36.

The remaining customers 15 in the bill pay request file are checked 110 for unfulfilled bill payment requests (e.g., payment requests not yet sent to and executed by the bill payment system 22). The customers 15 with pending bill payment requests are placed in the reactivation file 38 and sent 115 to the enrollment system 23 of the bill pay service provider 14, preferably electronically over the network 12 via FTP. The enrollment system 23 then reactivates the customers 15 with pending bill payment requests so that the pending bill payment requests can be performed by the bill pay service provider 14.

In the error handling phase 104, the error handling system 30 obtains the reactivation request rejection file 39 from the enrollment system 23, preferably electronically such as via FTP over the network 12. If no rejections are found 111, the financial institution 13 is released to await another cycle of deactivation 102 or reactivation 103. If rejections are found, bill pay processing is stopped 112 and an operations department of the enrollment system 23 is contacted 116, such as by logging onto a secure Internet site of the enrollment system. The rejected customer's enrollment is then manually reactivated 113 and bill pay processing is released 114 to complete the bill payment request.

A dynamic enrollment control system 10 of another embodiment of the present invention is shown in FIG. 4. The dynamic enrollment control system 10 includes a processor 50 that communicates with other elements within the dynamic enrollment control system via a system interface or bus 51. Also included in the dynamic enrollment control system 10 is a display device/input device 52 for receiving and displaying data. The display device/input device may be, for example, a keypad or pointing device that is used in combination with a display screen. The dynamic enrollment control system 10 further includes memory 53, which preferably includes both read only memory (ROM) 54 and random access memory (RAM) 55. The ROM 54 is used to store a basic input/output system (BIOS) 56, containing the basic routines that help to transfer information between elements within the dynamic enrollment control system 10.

In addition, dynamic enrollment control system 10 includes at least one storage device 57, such as a hard disk drive, a floppy disk drive, a CD-ROM drive, or optical disk drive, for storing information on various computer-readable media, such as a hard disk, a removable magnetic disk, or a CD-ROM drive, or optical disk drive, for storing information on various computer-readable media, such as a hard disk, a removable magnetic disk, or a CD-ROM disk. As will be appreciated by one of ordinary skill in the art, each of these storage devices 57 is connected to the system bus 51 by an appropriate interface. The storage devices 57 and their associated computer-readable media provide non-volatile storage for the dynamic enrollment control system 10. It is important to note that the computer-readable media described above could be replaced by any other type of computer readable media known in the art. Such media include, for example, magnetic cassettes, flash memory cards, digital video disks, and Bernoulli cartridges.

A number of program modules may be stored by the various storage devices, such as within RAM 55 (as shown in FIG. 4) or within the storage device 57 (as not shown for clarity). Such program modules include an operating system 58, an initial deactivation module 59, a recurrent deactivation module 60, a reactivation module 61, and error handling module 70, a service activity monitor module 62, a dormancy determination module 63 and a service request monitor module 64. The modules control certain aspects of the operation of the dynamic enrollment control system 10, as is described above, with the assistance of the processor 50 and the operating system 58. While described as separate modules, these functions may, instead, be integrated.

Also located within the dynamic enrollment control system 10, is a system interface 65 for interfacing and communicating with other elements of the bill payment system 22 of the financial institution 13 and the online banking system 16 of the bill pay service provider 14. It will be appreciated by one of ordinary skill in the art that one or more of the dynamic enrollment control system's components may be located geographically remotely from other dynamic enrollment control system components. Furthermore, one or more of the components may be combined, and additional components performing functions described herein may be included in the dynamic enrollment control system.

The present invention has many advantages. For instance, the dynamic enrollment control system, method and computer program product 10 deactivates the enrollment of customers 15 not actively using the bill pay system 22 which reduces the costs of operation for the financial institution 13. In addition, the reactivation system 29 ensures that any pending bill payment requests logged with the financial institution are fulfilled by reactivating the requesting customer's enrollment. Such reactivations are performed on a relatively short cycle, e.g., daily, so that the dynamic enrollment control system, method and computer program product 10 is relatively transparent to the customers 15. In other words, the delay in fulfillment of the bill pay request is no longer for the deactivated customer than for the currently enrolled customer. The error handling system 30 ensures that all of the deactivated customers that are not successfully reactivated by the reactivation system 29 are manually reactivated almost immediately and that bill payment is not erroneously verified before the bill payment request is successfully submitted to the bill payment system 22.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dynamic enrollment control system for selectively activating and deactivating enrollment of a plurality of beneficiaries of a first entity in a service program of a second entity, said dynamic enrollment control system comprising:

a service program monitoring system connected in electronic communication with the second entity configured to request and receive from the second entity provided services information describing the beneficiaries currently enrolled in the service program and a most recent date of services provided by the second entity to the currently enrolled beneficiaries;

a dormancy determination system operating separately from the service program monitoring system connected in electronic communication with the service program monitoring system configured to compile dormant customer information identifying currently enrolled beneficiaries described in the provided services information who have not been provided services by the second entity within a dormancy threshold time; and a deactivation system connected in electronic communication with the second entity and the dormancy determination system, said deactivation system being configured to compile deactivation request information including at least some of the beneficiaries described in the dormant customer information and further configured to send the deactivation request information to the second entity for deactivation of the beneficiaries described therein from the service program;

a service request activity monitoring system connected in electronic communication with the first entity configured to request and receive from the first entity service request activity information describing each of the beneficiaries that have made service requests which remain unfulfilled by the second entity; and an activation system connected in electronic communication with the second entity, the service program monitoring system and the service request activity monitoring system, said activation system configured to compile activation request information describing the beneficiaries that are not currently enrolled and that have unfulfilled service requests by removing the currently enrolled beneficiaries described in the provided services information from the beneficiaries described in the service request activity information, said activation system being further configured to send the activation request information to the second entity for enrollment of the beneficiaries described therein in the service program.

2. The dynamic enrollment control system of claim 1, wherein the deactivation system is further connected in communication with the service request activity monitoring system and wherein the deactivation request information includes the beneficiaries described in the dormant customer information that are not described in the service request activity information.

3. The dynamic enrollment control system of claim 2, wherein the dormancy determination system is configured to determine an elapsed time between a present date and the most recent date of services provided to each of the beneficiaries described in the provided services information and is further configured to compare the elapsed time for each of the beneficiaries to the dormancy threshold time to compile the dormant customer information.

4. The dynamic enrollment control system of claim 1, further comprising an error determination system connected in communication with the second entity, said error determination system configured to request and compile from the second entity enrollment rejection information describing the beneficiaries from the activation request information that the second entity failed to enroll in the service program.

5. The dynamic enrollment control system of claim 4, wherein the error determination system is further configured to manually enroll the beneficiaries from the enrollment rejection information.

6. The dynamic enrollment control system of claim 5, wherein the error determination system is further configured to withhold a verification of fulfillment of the service request associated with the unfulfilled service request activity until successful enrollment of the beneficiaries described in the enrollment rejection information.

7. The dynamic enrollment control system of claim 1, further comprising an initial deactivation system connected in electronic communication with the second entity and the dormancy determination system, said initial deactivation system configured to send the dormant customer information directly to the second entity for deactivation of all of the beneficiaries described therein from the service program in response to initial startup of the dynamic enrollment control system.

8. The dynamic enrollment control system of claim 1, the services provided by the second entity are bill payment services.

9. A method of controlling enrollment of a plurality of beneficiaries of a first entity in a service program of a second entity, said method of controlling enrollment comprising:

identifying, through a dormancy determination module, dormant ones of the beneficiaries who have not been provided services by the second entity within a dormancy threshold time using information from the second entity;

sending, through the dormancy determination module, information describing the dormant beneficiaries to the second entity for deactivation of enrollment of the dormant beneficiaries by the second entity;

identifying, through a service program monitoring module operating separately from the dormancy determination module, currently enrolled ones of the beneficiaries using information from the second entity;

identifying, through a service request activity monitoring module, pending service request ones of the beneficiaries that have made service requests of the first entity which remain unfulfilled by the second entity using information obtained from the first entity; and sending, through the service request activity monitoring module, activation information describing the beneficiaries with pending service requests who are not currently enrolled in the service program to the second entity for activation of the beneficiaries described therein; wherein the activation information, sent through the service request activity monitoring module, describing the beneficiaries not currently enrolled is compiled by removing the currently enrolled beneficiaries identified in the service program monitoring module, from the beneficiaries described in the service request activity information.

10. The method of controlling enrollment of claim 9, further comprising: periodically identifying newly dormant ones of the enrolled beneficiaries after generating and sending information describing the dormant beneficiaries; and generating and sending information describing the newly dormant beneficiaries who are not pending service request beneficiaries to the second entity for deactivation of enrollment of the newly dormant beneficiaries who are not pending service request beneficiaries by the second entity.

11. The method of controlling enrollment of claim 9, further comprising determining which of the pending service request beneficiaries were not enrolled subsequent to sending of the activation information to the second entity and manually enrolling the pending service request beneficiaries for whom the activation request failed.

12. The method of controlling enrollment of claim 11, further comprising withholding fulfillment verification of the pending service requests of the pending service request beneficiaries for whom the activation request failed until completion of manual enrollment.

13. The method of controlling enrollment of claim 9, wherein identifying dormant beneficiaries includes determining an elapsed time between a present date and a most recent date of services provided to each of the currently enrolled beneficiaries and determining each of the beneficiaries having the elapsed time that exceeds the dormancy threshold time.

14. The method of controlling enrollment of claim 9, wherein the services provided by the second entity are bill payment services.

15. A computer program product of controlling enrollment of a plurality of beneficiaries of a first entity in a service program of a second entity, the computer program product comprising a computer-readable storage medium having computer-readable program code portions stored therein, the computer-readable program code portions comprising: a first executable code portion for identifying dormant beneficiaries who have not been provided services by the second entity within a dormancy threshold time using information from the second entity; a second executable code portion for sending information describing the dormant beneficiaries to the second entity for deactivation of enrollment of the dormant beneficiaries by the second entity; a third executable code portion for identifying currently enrolled beneficiaries using information from the second entity a fourth executable code portion for identifying pending service request beneficiaries that have made service requests of the first entity which remain unfulfilled by the second entity using information obtained from the first entity; and a fifth executable code portion for sending activation information describing the pending service request beneficiaries who are not currently enrolled in the service program to the second entity for activation of the beneficiaries described therein, the entities operating separately; wherein the activation information, sent by the fifth executable code portion, describing the beneficiaries not currently enrolled is compiled by removing the currently enrolled beneficiaries identified in the third executable code portion, from the beneficiaries described in the fourth executable code portion.

16. The computer program product of claim 15, further comprising: a sixth executable code portion for periodically identifying newly dormant ones of the enrolled beneficiaries after generating and sending information describing the dormant beneficiaries; and a seventh executable code portion for generating and sending information describing the newly dormant beneficiaries who are not pending service request beneficiaries to the second entity for deactivation of enrollment of the newly dormant beneficiaries who are not pending service request beneficiaries in the service program by the second entity.

17. The computer program product of claim 15, further comprising: an eighth computer program code portion for determining which of the pending service request beneficiaries were not enrolled subsequent to sending of the activation information to the second entity and manually enrolling the pending service request beneficiaries for whom the activation request failed.

18. The computer program product of claim 17, further comprising: a ninth executable program code portion for withholding fulfillment verification of the pending service requests of the pending service request beneficiaries for whom the activation request failed until completion of manual enrollment.

19. The computer program product of claim 16, wherein the first executable code portion is also for determining an elapsed time between a present date and a most recent date of services provided to each of the currently enrolled beneficiaries and determining each of the beneficiaries having the elapsed time that exceeds the dormancy threshold time.

20. The dynamic enrollment control system of claim 1, wherein the dynamic enrollment control system is part of an enrollment control entity, which acts as an intermediary between the second entity and the first entity by selectively activating and deactivating a plurality of beneficiaries of the first entity in a service program of the second entity.

21. The dynamic enrollment control system of claim 20, wherein the dynamic enrollment control system is part of an enrollment control entity, which is separate from, but connected in electronic communication with, both the first entity and the second entity.

22. The dynamic enrollment control system of claim 20, wherein the dynamic enrollment control system is part of an enrollment control entity, which is separate from the second entity, but subsumed within the first entity, and connected in electronic communication with both.

23. The dynamic enrollment control system of claim 1, wherein the dynamic enrollment control system is part of an enrollment control entity, which is separate from, but connected in electronic communication with, both the first entity and the second entity.

24. The dynamic enrollment control system of claim 1, wherein the dynamic enrollment control system is part of an enrollment control entity, which is separate from the second entity, but subsumed within the first entity, and connected in electronic communication with both.

25. The dynamic enrollment control system of claim 1, wherein said dynamic enrollment control system is configured to exchange data with any first entity and with any second entity and to selectively activate and deactivate enrollment of a plurality of beneficiaries of the first entity in a service program of the second entity; and wherein the enrollment control entity is configured to send or receive system information to or from other entities.

26. The dynamic enrollment control system of claim 25, wherein the first entity is a financial institution.

27. The dynamic enrollment control system of claim 25, wherein the second entity is a bill pay service provider.

28. The dynamic enrollment control system of claim 25, wherein the system information is sent or received via electronic communication.

29. The dynamic enrollment control system of claim 25, wherein the system is a bill payment system and the service program is a bill payment service program.

30. The dynamic enrollment control system of claim 25, wherein the data and system information are both bill payment system information.

31. The dynamic enrollment control system of claim 25, wherein the system is a parking service system and the service program is a parking service program.

* * * * *